US009949576B2

(12) United States Patent
Giulietti

(10) Patent No.: US 9,949,576 B2
(45) Date of Patent: Apr. 24, 2018

(54) SMART REFRIGERATED COUNTER SYSTEM

(71) Applicant: INDUSTRIE SCAFFALATURE ARREDAMENTI—ISA S.R.L., Bastia Umbra (IT)

(72) Inventor: Marco Giulietti, Bastia Umbra (IT)

(73) Assignee: INDUSTRIE SCAFFALATURE ARREDAMENTI—ISA S.R.L., Bastia Umbra (PG) (IT)

( * ) Notice: Subject to any disclaimer, the term of this patent is extended or adjusted under 35 U.S.C. 154(b) by 235 days.

(21) Appl. No.: 15/082,177

(22) Filed: Mar. 28, 2016

(65) Prior Publication Data
US 2017/0278247 A1 Sep. 28, 2017

(51) Int. Cl.
*H04N 13/02* (2006.01)
*A47F 3/00* (2006.01)

(52) U.S. Cl.
CPC ............ *A47F 3/00* (2013.01); *H04N 13/0271* (2013.01)

(58) Field of Classification Search
CPC .... G06Q 10/08; G06Q 10/04; G06Q 30/0639; G06Q 10/087; G06T 7/0075
USPC .......................................................... 705/17
See application file for complete search history.

(56) References Cited

U.S. PATENT DOCUMENTS

| 8,109,301 | B1 | 2/2012 | Denise | |
| 2010/0010902 | A1* | 1/2010 | Casey | G06Q 10/08 705/17 |
| 2012/0158385 | A1* | 6/2012 | Arunapuram | G06Q 10/04 703/6 |
| 2013/0191246 | A1* | 7/2013 | Calman | G06Q 30/0639 705/26.9 |
| 2014/0252091 | A1* | 9/2014 | Morse | F25D 29/00 235/385 |
| 2015/0125574 | A1* | 5/2015 | Arent | B65D 75/008 426/106 |
| 2017/0147971 | A1* | 5/2017 | Morse | G06Q 10/087 |
| 2017/0259304 | A1* | 9/2017 | Zsigmond | B07C 5/34 |
| 2017/0308940 | A1* | 10/2017 | Casey | G06Q 10/08 |

FOREIGN PATENT DOCUMENTS

WO 0215073 A1 2/2002

\* cited by examiner

*Primary Examiner* — Tung Vo
(74) *Attorney, Agent, or Firm* — Egbert Law Offices, PLLC

(57) ABSTRACT

A refrigerated counter system includes a refrigerated counter, 3D filming means arranged in such manner to take 3D images of the products contained in the refrigerated counter and of an area in front of the refrigerated counter, a PC connected to the 3D filming means to process statistic data according to the 3D images taken by the 3D filming means, and a CPU connected to the PC to control the operating parts of the refrigerated counter according to the statistic data processed by the PC.

10 Claims, 4 Drawing Sheets

SMART REFRIGERATED COUNTER SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present patent application for industrial invention relates to a smart refrigerated counter system.

2. Description of Related Art Including Information Disclosed Under 37 CFR 1.97 and 37 CFR 1.98

Refrigerated counters provided with shelves whereon food products of different kind are displayed and stored at the correct temperature are commonly used in points of sale, such as supermarkets. Consumers can pick the products they want to purchase directly from the refrigerated counter.

However, the refrigerated counters of known type are impaired by some drawbacks because they do not provide the supermarket manager and/or the user with any information on how sales are made. For this reason, refrigerated counters are managed empirically and the way in which the sales are made is left to the experience of the supermarket manager.

It must be considered that the supermarket manager has no information on the type of consumers who purchase products from the refrigerated counter, on the time of their visit, on the choice they make, on the products that are about to be sold out, etc. On the contrary, such information would be important both for managing the refrigerated counter and for interacting with consumers.

The purpose of the present invention is to eliminate the drawbacks of the prior art by providing a smart refrigerated counter system that can acquire information in the area in front of the refrigerated counter and use it both for managing the refrigerated counter and for interacting with consumers.

BRIEF SUMMARY OF THE INVENTION

This purpose is achieved according to the invention, with the characteristics claimed in the independent claim 1.

Advantageous embodiments of the invention appear from the dependent claims.

The refrigerated counter system of the invention interacts with the space where it is positioned.

When the user is inside the space of interest of the refrigerated counter, the system detects real time information on attention showed by the user for a specific product or for a specific display area of the refrigerated counter, as well as on merchandising ergonomics (position and picking mode of the products). Moreover, the system records and counts the sold products, and correlates the information with macroparameters, such as customer type or opening hours. In this way, the retailer (either the shop owner or the distribution chain) receives a set of useful information to improve the sales performance of the refrigerated counter, such as:

- timely refilling of products (for example, a specific type of product can be re-stocked before it is sold out);
- details on the customer relation with the products (for example, it is possible to analyze the effect on the emotions and interest of customers for the products according to the shelf position or the lighting conditions) or on the way products are accessed (for example, it is possible to assess the way in which customers have access to the products, or the effect of the geometrical placement of the products in the display space on the purchasing decisions made by customers);
- statistic analysis and correlation between the sales trends of the products and various parameters, such as opening hours, days of the week, type of customers (adults, children, men, women, etc.), promotional activities carried out in the surrounding areas, meteorological data, etc.

The system of the invention can automatically adjust the operation of the refrigerated counter according to the environmental operating conditions and to the customer traffic and use conditions, also in forecast mode.

Using 3D filming means, such as for example 3D cameras with coded light and time of flight (TOF) function, the system can process in real time the 3D images of the scene that includes the refrigerated counter and the area in front of the refrigerated counter, providing metric measurements of persons and objects expressed in millimeters (mm), and not in pixels. Image processing detects the modes in which different persons and/or objects interact with the refrigerated counter, providing information such as:

- type and number of users that stand in front of the refrigerated counter and interact with it;
- permanence and interaction time of the users;
- relation between the interaction mode and the opening hours of the point of sale where the refrigerated counter is positioned;
- picking area of the product in the refrigerated counter.

After being taken by the 3D cameras, the information is processed in the PC with a 3D image recognition software application, generating information that are important for managing the refrigerated counter in order to save energy, manage the operation in the best way possible and provide the retailer with important statistic data, including of graphic kind, on product consumption.

Moreover, after processing the statistics, the PC can show video clips, advertising banners or other promotional information through one or more displays.

The PC can generate electronic messages (by e-mail) or visual messages by means of alarm devices (videos or electromechanical systems, as indicator lights) to refill the products before they are sold out or to carry out preventive maintenance actions.

BRIEF DESCRIPTION OF THE SEVERAL VIEWS OF THE DRAWINGS

Further characteristics of the invention will appear evident from the detailed description below, which refers to a merely illustrative, not limiting embodiment illustrated in the attached drawings, wherein.

DETAILED DESCRIPTION OF THE INVENTION

The refrigerated counter system of the invention is described with reference to the figures and is generally indicated with numeral reference (100).

The system (100) comprises:
- a refrigerated counter (1) comprising a CPU (200) to control the operating parts of the refrigerated counter (1),
- 3D (three-dimensional) filming means (2) arranged in such manner to take 3D images of the products contained in the refrigerated counter and of users standing in front of the counter, and
- a PC (4) connected to the 3D filming means and to the CPU (200).

The PC (4) analyzes the 3D images taken by the 3D filming means (2) and processes statistic data on the use of the refrigerated counter. According to said statistic data, the PC sends control signals to the CPU (200) that controls the operating parts of the refrigerated counter.

The CPU (200) is connected to a power supply (A) and manages the actuation and the electrical power supply of the various operating parts of the refrigerated counter.

Figure 1:
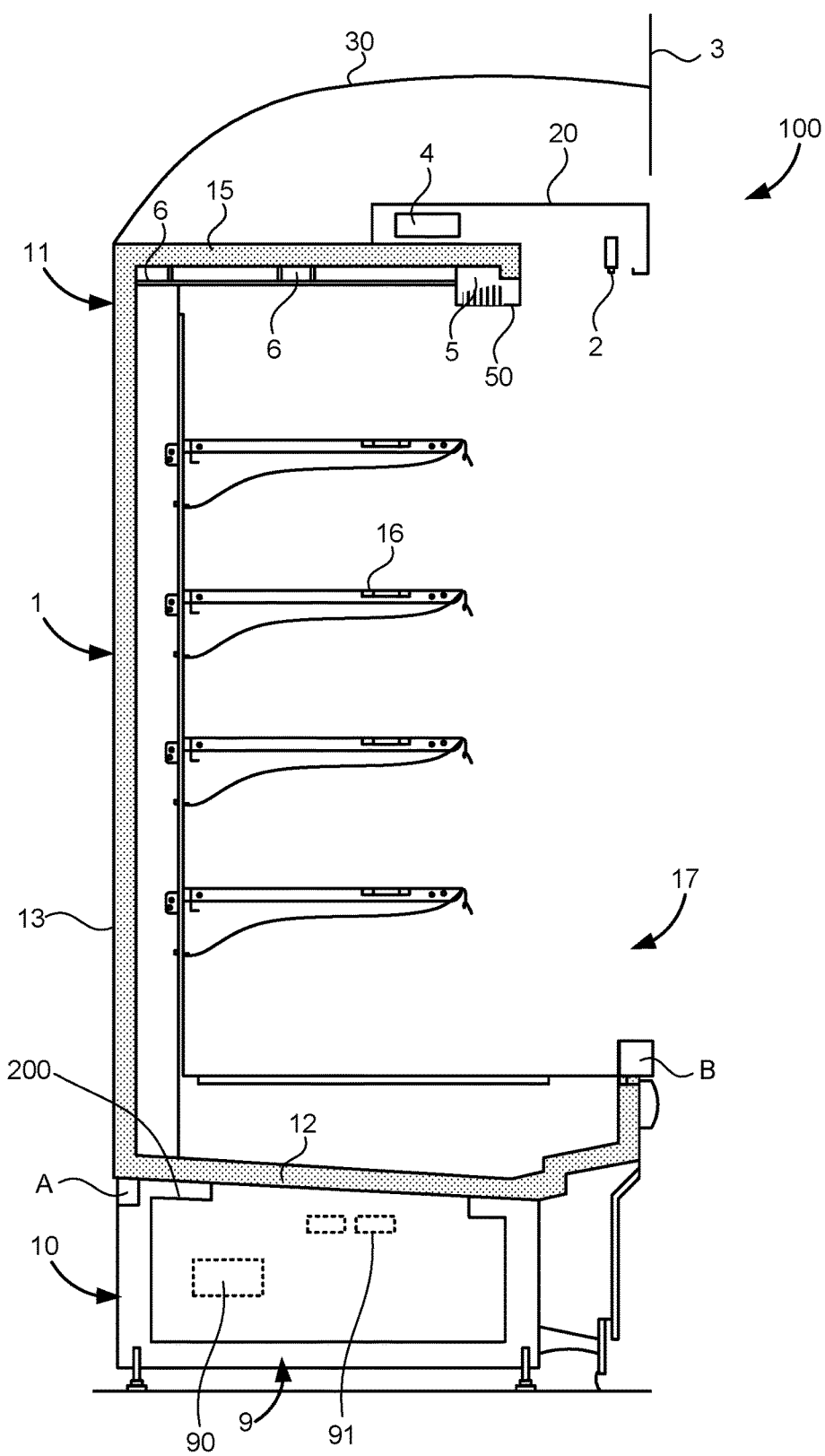
FIG. 1 is a diagrammatic side view of a refrigerated counter system according to the invention.
Figure 2:
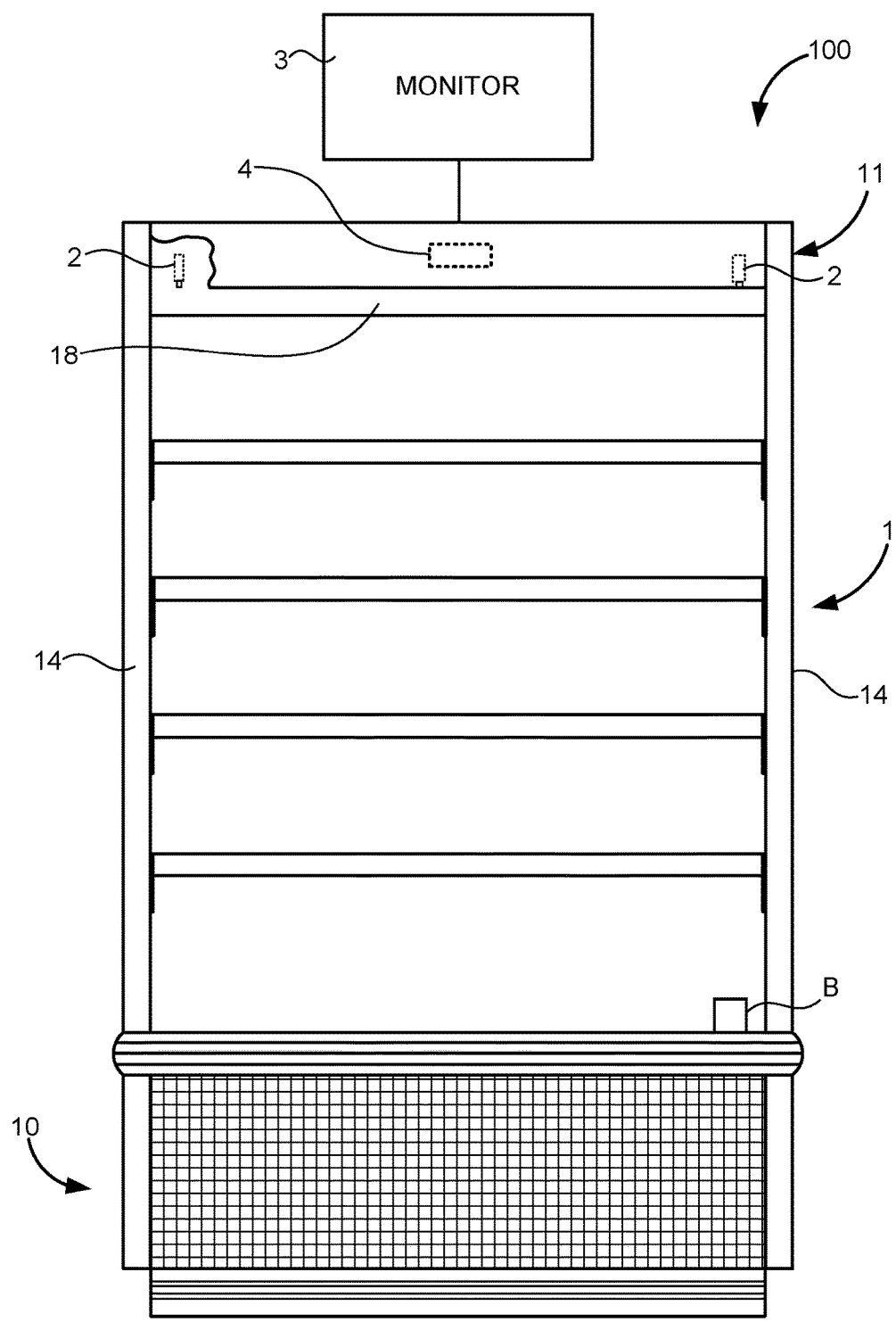
FIG. 2 is a front view of the system of FIG. 1.
Figure 3:
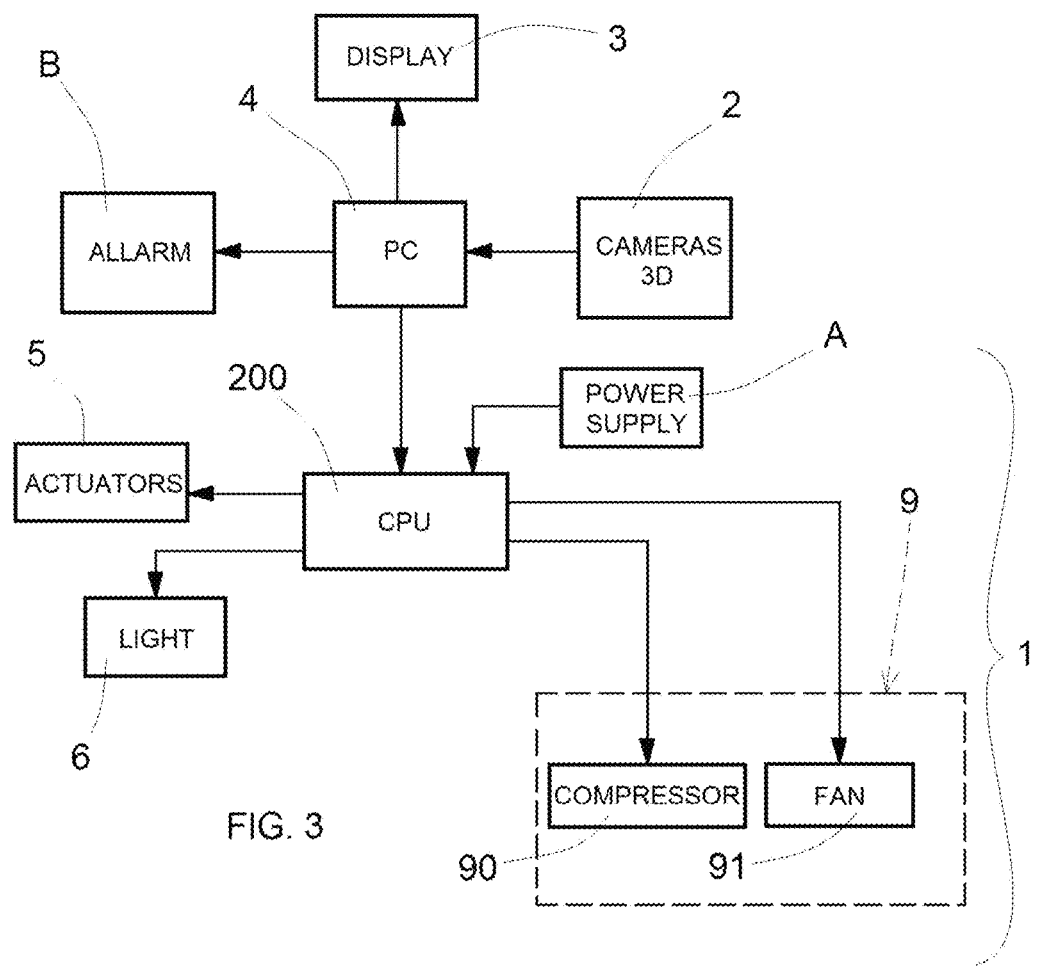
FIG. 3 is a block diagram that diagrammatically shows the refrigerated counter system according to the invention.

Referring to FIGS. 1 and 2, the refrigerated counter (1) comprises a base (10) that supports a body (11) with a substantially parallelepiped shape. The body (11) comprises a bottom wall (12), a back wall (13), two lateral walls (14) and one upper wall (15). In view of the above, the body (11) defines a compartment used to contain the food products to be refrigerated. Advantageously, a plurality of shelves (16) is arranged in the compartment of the body (11), defining a plurality of spaces where different products are positioned.

The body (11) is opened on the front, meaning that the body (11) is provided with a front opening (17) in order to introduce and pick the food products. For illustrative purposes, FIGS. 1 and 2 illustrate an open refrigerated counter; in this case the refrigerated counter (1) can comprise shades or shutters (50) actuated by actuators (5) to close the front opening (17) of the body.

The shades (50) and the actuators (5) are mounted in the body (11), for example under the upper wall (15) of the frame. The actuators (5) are controlled by the CPU (200). The actuators (5) can be electrically operated gear motors.

A plurality of lights (6), such as for example lamps or LEDs, is mounted in the body (11) to illuminate the various spaces of the compartment of the frame. The lights (6) are connected to and controlled by the CPU (200).

A refrigeration circuit (9) of known type is mounted in the base (10). The refrigeration circuit (9) comprises: a compressor (90), one or more heat exchangers (condenser and evaporator), an expansion element and fans (91) to introduce cold air in the compartment of the refrigerated counter. The evaporator can be contained in the body or in the base according to the specific case. The power dissipating elements are the compressor (90) and the fans (91). In any case, the refrigeration circuit (9) is connected to the CPU (200) that controls the power supply and the operation of the compressor (90) and the fans (91).

Optionally, the system (100) can comprise an alarm (B). The alarm (B) can be an acoustic alarm (buzzer), a luminous alarm, or preferably a display. The alarm (B) can also be the display (3) or a communication device suitable for sending an alarm signal to a remote surveillance system positioned at a distance from the refrigerated counter (1).

At least one first bracket (20) that protrudes frontally from the upper wall (15) is provided on the upper wall (15) of the frame to support the 3D filming means (2). The 3D filming means are arranged in such manner to take both the compartment of the frame of the refrigerated counter and the area in front of the front opening (17) of the frame of the refrigerated counter. For instance, the filming area of the 3D filming means (2) is within 2 m from the front opening (17) of the frame of the refrigerated counter. In view of the above, the 3D filming means take images of the products contained in the refrigerated counter and of the users approaching the refrigerated counter in order to purchase or inspect the products contained in the refrigerated counter.

The 3D filming means (2) preferably comprise at least one 3D camera, but can also comprise 3D laser scanners.

The purpose of the image acquisition from the 3D cameras (2) and of the image processing is to reconstruct the 3D scene in front of the refrigerated counter (1) with the highest precision possible, regardless of the lighting conditions and of any interference, such as reflections and shadows. To that purpose, the 3D filming means (2) preferably comprise at least one 3D camera used to take 3D images, which is provided with coded light and time of flight (TOF) function. Such a type of camera is capable of capturing the complete scene, just like a photograph, with the difference that each pixel of the image captured by the camera has no color information, but measuring information on the distance of the person from the camera, thus allowing for a 3D reconstruction of the object or of the scene.

As a matter of fact, the TOF function allows to assess the distance between the camera and the taken objects or scene in real time, measuring the time needed by a luminous impulse to cover the distance between the camera and the object (time of flight). This technique has been preferred to 3D laser scanners that analyze the scene a line at a time.

It must be considered that the images taken by ordinary cameras would not allow 3D decoding because they do not guarantee an accurate measurement of distances. As a matter of fact, ordinary cameras acquire color pixels with information on color rather than dimensional pixels with information on the distance of the object. Therefore, ordinary cameras are much more affected than 3D cameras by ambient lighting. Moreover, 3D TOF cameras generate a depth map system with an accuracy of approximately 1 cm.

Additionally, the use of 3D data, and not images, eliminates any type of privacy issues. In fact, people cannot be recognized from depth maps.

The images taken by the 3D camera (2) can have different formats according to the type of camera, the camera drivers and the PC (4), as well as the operating system of the PC (4) interfaced with the camera. Images are preferably coded in ASCII format, which provides information divided in several vectors, one for each axis of a set of three Cartesian axes. The ASCII images are processed by the driver of the PC (4) and by the operating system of the PC (4), for example using the C++ programming language.

A software application with an algorithm is installed in the PC (4) to decode the following data from the images:
- measurements of the distance of the users from the refrigerated counter,
- permanence time of the users in front of the refrigerated counter,
- position of picking areas of the food products in the refrigerated counter.

Data is processed in such manner to generate a list of information that can be used by the supermarket manager, the retailer or the manufacturer of the refrigerated counter (1). The measurements decoded by the algorithm provide a list of data on the behavior or on the type of users in front of/inside the refrigerated counter (1) according to the attendance time, the permanence time or other data, such as the external temperature and the meteorological conditions.

Data can be processed and organized in different ways, according to the customer's needs and to the store target. For example, the system can take 2D photographs, i.e. static photographs of the products contained in the refrigerated counter at certain times and overlap a diagram of the products that are picked from the refrigerated counter on the photographs, showing the areas of the refrigerated counter with different picking frequency with different colors. In this way the retailer or store manager can obtain statistics on the most-picked products in certain time periods. It is also possible to distinguish a picking diagram according to the different type of person (for example, adults, children, men, and women).

Furthermore, the picking frequency (number of picking actions/time) of the products displayed in the refrigerated counter can be correlated with the external temperature, thus detecting the most-desirable products according to the meteorological conditions.

Optionally, the system (100) can comprise at least one display (3) arranged in such a way to be seen by the users of the refrigerated counter. A second bracket (30) is arranged on the upper wall (15) of the frame of the refrigerated counter to support the display (3).

According to the statistics generated by the monitoring action of the 3D filming means (2) and by the processing made by the PC (4), the software can generate statistics on consumer experiences. According to the statistics, the software of the PC (4) automatically generates video clips displayed by the display (3). Such video clips are oriented to the type of predominant consumer in certain time periods in order to stimulate the consumption of specific products. For example, if the statistic data on customer attendance in front of the counter detect a predominance of children in the time period comprised between 3:00 p.m. and 4:00 p.m., in this time period the display (3) will show banners and spots for under-14 customers.

It must be considered that the products can be stored in the refrigerated counter (1) at a correct storage temperature.

Statistic data on the frequency with which consumers pass in front of the refrigerated counter during the day is stored in the PC (4). According to the statistic data, it can be determined when the refrigeration circuit (9) must operate at maximum or minimum power.

When the statistic data processed by the PC (4) show that the flow of users is low, the PC (4) sends control signals indicative of a low flow to the CPU (200). Accordingly, the CPU (200) controls the compressor (90) and the fans (91), if necessary, in such manner to operate the refrigeration circuit (9) at minimum power to guarantee a correct storage temperature for the products. Simultaneously, the CPU (200) also controls the dimming or switching-off of the lights (6) of the refrigerated counter for energy saving purposes.

Moreover, when the PC detects the absence of customers from the images taken by the 3D cameras (2), the PC sends a control signal to the CPU to actuate the actuators (5) of the shades in order to lower the shades (50). In this way, the compartment of the refrigerated counter can be thermally insulated from the outside, thus guaranteeing high energy saving when customers are not present.

Instead, when the 3D cameras (2) detect a high flow of customers, the PC (4) sends control signals indicative of a high flow to the CPU (200). Accordingly, the CPU (200) controls the compressor (90) and the fans (91), if necessary, in such manner to operate the refrigeration circuit (9) at maximum power to achieve a correct temperature for the products in the shortest time possible. Simultaneously, the CPU (200) controls the switching-on of the lights (6) of the refrigerated counter at the maximum level. If the shades (50) of the refrigerated counter are closed, the CPU actuates the actuators (5) of the shades in order to raise the shades (50).

When the PC (4) detects from the 3D images taken y the 3D cameras (2) that a certain product in the refrigerated counter is about to be sold out, the PC (4) sends control signals to the alarm (B), which are indicative that a product is about to finish. In this way, the operator can refill the refrigerated counter with the product. The alarm (B) can be also arranged in remote position with respect to the refrigerated counter, for example in a control station of the supermarket manager situated in the warehouse where the goods are stored. In such a case, a wireless connection can be provided between the PC (4) and the alarm (B). Alternatively, the alarm signal can be an e-mail or an SMS text message sent by the PC (4) to an alarm device (B) consisting in a communication device, such as a computer, a mobile telephone or the like.

Figure 4:
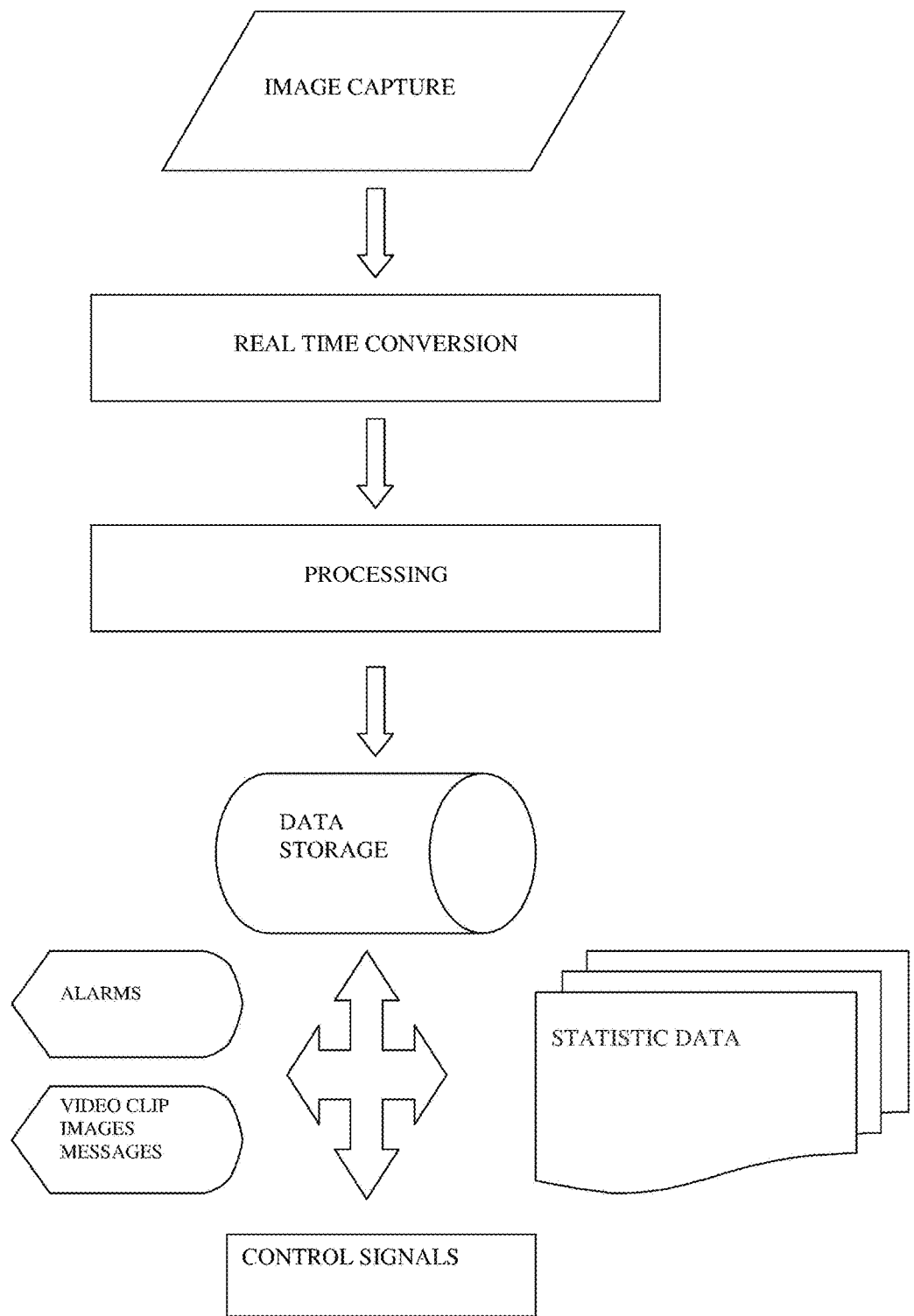
FIG. 4 is a flow diagram that illustrates the operation of the refrigerated counter system according to the invention.

FIG. 4 shows the data flow of the system according to the present invention.

The 3D images captured by the 3D camera (2) are converted in real time in a 3D depth map with metric measurements of the objects and persons taken by the 3D camera (2).

The data of the 3D depth map is analyzed in the PC (4) in order to obtain information on the use and/or status of the refrigerated counter.

For instance, the information on the use of the refrigerated counter can be information on the type of users, the number of users and the picking of products in the compartment of the refrigerated counter. The information on the status of the refrigerated counter can be information on the lights (on or off), the shades (open/closed), and the doors (open/closed).

The information on the use and status of the refrigerated counter is stored in the PC (4) and processed in order to obtain:
- statistic data that is stored in order to be used for consumption statistics;
- control signals that are sent to the CPU (200) to control the operating parts (5, 6, 9) of the refrigerated counter;
- video clips, images and information/advertising messages that are sent to the display (3); and
- alarm signals that are sent to the alarm (B).

Numerous variations and modifications can be made to the present embodiments of the invention, which are within the reach of an expert of the field, while still falling within the scope of the invention.

I claim:

1. Refrigerated counter system comprising:
    a refrigerated counter comprising a compartment wherein a plurality of products to be refrigerated is contained, and a computer unit (CPU) intended to control the operating parts of said refrigerated counter,
    three dimensional (3D) filming means arranged in such manner to take images of the products contained in the compartment of the refrigerated counter and generate three dimensional (3D) images, and
    a PC analyzing means connected to said 3D filming means and to said CPU;
said PC being configured to:
    process the 3D images taken by the 3D camera in such manner to generate a three dimensional (3D) depth map with metric measurements of objects of said 3D images;
    analyze said 3D depth map to obtain information on the status of the refrigerated counter, including status of operating parts of the refrigerated counter and of the products contained in the compartment of the refrigerated counter;
    process said information on the status of the refrigerated counter in such manner to generate control signals to be sent to said CPU;
    said CPU being configured to receive said control signals from the PC;
wherein
    said 3D filming means are arranged in such manner to frame and take images of an area in front of the refrigerated counter in order to capture images of the users standing in front of the refrigerated counter and generate 3D images on the user interaction with the refrigerated counter that are sent to said PC, which processes the images and sends control signals to the CPU;
    wherein said PC performs at least one of measurements of the distance of the user from the refrigerated counter, permanence time of the user in front of the refrigerated counter, or position of picking areas of the food products in the refrigerated counter based on the 3D depth map and 3D image of the user; and
    said CPU is configured to receive said control signals from the PC and control the operating parts of the refrigerated counter according to the control signals received from said PC.

2. The system of claim 1, also comprising at least one display connected to the PC and arranged in such manner to be seen by the users of the refrigerated counter; said PC being configured in such manner to generate video clips, messages and images according to the information on the use and/or status of the refrigerated counter and send said video clips, messages and images to the display.

3. The system of claim 1, also comprising at least one alarm connected to the PC; said PC being configured in such manner to detect from said information on the use and/or status of the refrigerated counter when a product contained in the refrigerated counter is about to be sold out and accordingly generate alarm signals to be sent to said alarm.

4. The system of claim 1, wherein said refrigerated counter comprises a refrigeration circuit comprising a compressor and at least one fan connected to said CPU; said PC being configured in such manner to detect from said information on the use and/or status of the refrigerated counter when there is a low or high customer flow at the refrigerated counter and send control signals to said CPU in such manner to operate the compressor and said at least one fan according to the customer flow.

5. The system of claim 1, wherein said refrigerated counter comprises shades or shutters to close the front opening of the refrigerated counter and actuators to actuate said shades, said actuators being connected to said CPU; said PC being configured in such manner to detect from said information on the use and/or status of the refrigerated counter the absence of customer flow at the refrigerated counter and send control signals to said CPU in such manner to operate said actuators and open and close said shades according to the customer flow.

6. The system of claim 1, wherein said refrigerated counter comprises lights connected to said CPU; said PC being configured in such manner to detect from said information on the use and/or status of the refrigerated counter when there is a low or high customer flow at the refrigerated counter and send control signals to said CPU in such manner to adjust the operation of said lights according to the customer flow.

7. Operating method of a refrigerated counter comprising the following steps:
    taking three dimensional (3D) images of products contained in the refrigerated counter by means of 3D filming means;
    converting said 3D images into a 3D depth map with metric measurements of the objects contained in said 3D images;
    analyzing said 3D depth map to obtain information on the status of the refrigerated counter, including status of operating parts the refrigerated counter and of the products contained in the compartment of the refrigerated counter, wherein:
    the taking step provides for capturing 3D images of users standing in front of the refrigerated counter and user interaction with the refrigerated counter;
    said 3D depth map contains metric measurements of the persons users contained in said 3D images;
    said analysis of said 3D depth map provides for obtaining information on the use of the refrigerated counter;
    wherein said the metric measurement is performed at least one of measurements of the distance of the user from the refrigerated counter, permanence time of the user in front of the refrigerated counter, or position of picking areas of the food products in the refrigerated counter based on the 3D depth map and 3D image of the user; and
    said method comprising a step wherein the operating parts of said refrigerated counter are controlled according to the processing of said information on the use and/or status of the refrigerated counter.

8. The method of claim 7, also comprising the following steps:
    generating video clips, messages and images based on said information on the use and/or status of the refrigerated counter processed by the PC; and
    displaying said video clips, messages and images by means of a display arranged in such manner to be seen by the users of the refrigerated counter.

9. The method of claim 7, also comprising the step of generating an alarm when the analysis of said 3D depth map detects that a product contained in the refrigerated counter is about to be sold out.

10. The method of claim 7, also comprising the step of actuating a compressor and at least one fan of a refrigeration circuit according to the customer flow detected when analyzing said 3D depth map.

* * * * *